G. GALLUP.
WEATHER STRIP.
APPLICATION FILED JAN. 24, 1908.
909,996.
Patented Jan. 19, 1909.
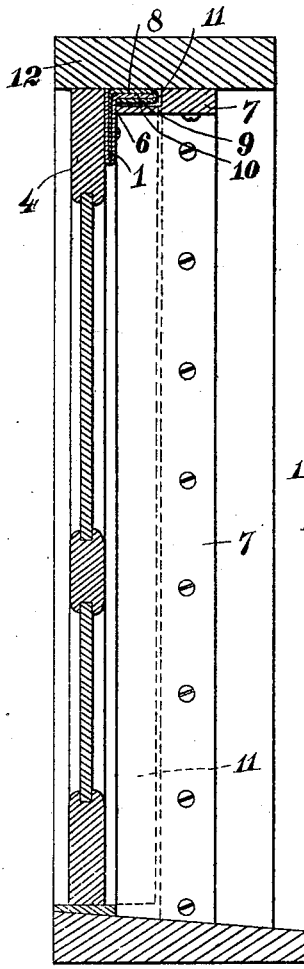
Fig. 1.
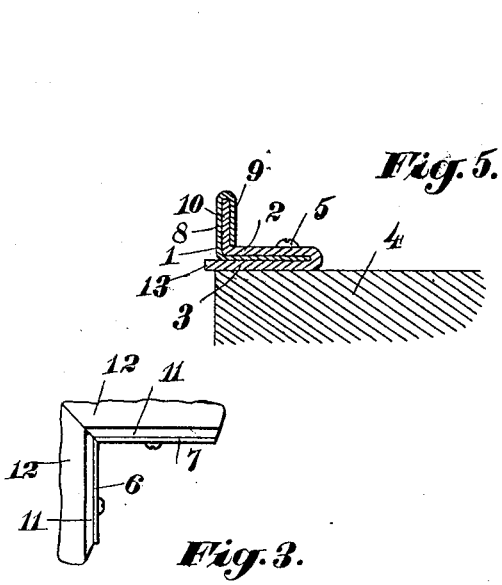
Fig. 5.
Fig. 3.
Fig. 4.
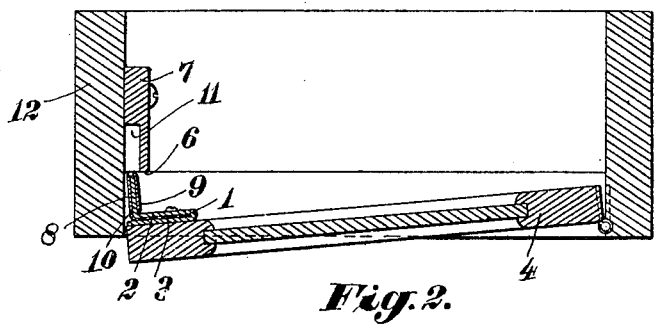
Fig. 2.
Witnesses;
G. A. Olson
H. S. Austin
Inventor;
George Gallup
by Joshua R. H. Potts
Atty.

UNITED STATES PATENT OFFICE.

GEORGE GALLUP, OF SHARON, WISCONSIN.

WEATHER-STRIP.

No. 909,996.      Specification of Letters Patent.      Patented Jan. 19, 1909.

Application filed January 24, 1908. Serial No. 412,437.

*To all whom it may concern:*

Be it known that I, GEORGE GALLUP, a citizen of the United States, residing at Sharon, county of Walworth, and State of Wisconsin, have invented certain new and useful Improvements in Weather-Strips, of which the following is a specification.

My invention relates to weather strips and especially to weather strips particularly adapted for use with doors or hinged windows.

The object of my invention is to provide a weather strip as mentioned which will effectually close the crevices about the door and one which shall be strong and durable, and of low cost of manufacture. Other objects will appear hereinafter.

With these objects in view my invention consists generally in a weather strip adapted to be secured to the door and comprising a strip of metal covered upon both sides by felt, the felt upon one side closing the joint between the strip and the door and that upon the other side closing the joint between the strip and the door-stop when the door is closed.

My invention further consists in suitable means for attaching the felt to the metal strip, such as a clamp formed upon the outer edge of the strip and in a suitable arrangement whereby the clamping portion of the strip shall not interfere with tightly closing the door.

My invention further consists in various details of construction and arrangements of parts all as will be hereinafter fully described and particularly pointed out in the claims.

My invention will be more readily understood by reference to the accompanying drawings forming a part of this specification and in which, Figure 1 is a vertical section through a door casing and door equipped with a weather strip embodying my invention in its preferred form, Fig. 2 is a horizontal section on the line *x*—*x* of Fig. 1, Fig. 3 is a detail view illustrating a corner of the door jamb, Fig. 4 is a detail illustrating the manner of connecting the horizontal and vertical portions of the weather strip at the corner of the door, and Fig. 5 is an enlarged detail sectional view of the weather strip illustrating the same attached to the edge of the door.

The weather strip comprises a strip of metal, 1 which is secured to the face of the door in a plane parallel with said face and a strip of felt bent about said metal strip forming the portions, 2 and 3, one upon each side thereof. The portion, 3 is arranged between the metal strip and the face of the door, 4 and forms a tight joint between said metal strip and the face of the door when in position.

5 indicates screws or other suitable means by which the device is secured to the door.

When the door is closed the edge, 6 of the door stop, 7 impinges against the portion, 2 of the felt strip tightly closing the joint between the door stop and the strip, 1. To secure the felt to the metal strip, I provide a suitable clamp on the edge of the latter. To this end the edge of the metal strip is bent at right angles as at 8 and then turned back upon itself as at 9 clamping the edge, 10 of the felt strip between the portions, 8 and 9.

The weather strip is secured to the face of the door with the portion, 8 flush with the edge of the door. The door stop 7 is provided with a recess, 11 which with the door jamb, 12 forms a groove to receive the clamp portion of the weather strip. The recess, 11 is deeper than the clamp portion of the weather strip in order that the edge 6 of the door stop may impinge against the portion 2 of the felt when the door is closed. It will be seen that a tight joint is thus formed, the portions, 3 of the felt forming an air tight joint between the weather strip and the door and the portion, 2 an air tight joint between the strip and the stop, 7. If preferred the portion, 3 of the strip may extend beyond the edge of the door and the portion 8 of the strip, as at 13, to impinge against the door jamb. (See Fig. 5).

In attaching the strip to a door the corner is mitered as shown in Fig. 4. To prevent the ends of the strip from being bent out of position, a key, 15 is provided. This comprises a short metal strip bent at right angles forming the tongues 16 which are inserted between the portions, 8 and 9 of the strip at their respective adjacent ends.

Having described my invention what I claim as new and desire to secure by Letters Patent is:

1. A door and door stop, in combination with a weather strip secured to said door and comprising a strip of metal covered upon both sides by felt and a clamp formed upon the edge of said strip, for attaching the felt thereto, said door stop having a groove or recess to receive said clamp, as and for the purpose specified.

2. A door and door stop, in combination with a weather strip secured to said door and comprising a metal strip and a strip of felt arranged upon both sides thereof one portion of the felt forming a tight joint between said strip and said door and the other portion forming a tight joint between said strip and said door stop when the door is closed, the outer edge of said strip being bent at right angles to the portion attached to the door and then bent back upon itself forming a clamp for one edge of the felt strip, and a recess in said door stop to receive said clamp, substantially as described.

In testimony whereof I have signed my name to this specification in the presence of two subscribing witnesses.

GEORGE GALLUP.

Witnesses:
W. S. HAMLIN,
W. F. GOELZER.